United States Patent [19]
Guyot

[11] Patent Number: 4,948,952
[45] Date of Patent: Aug. 14, 1990

[54] ELECTRON TUBE FOR THE DETECTION, MEMORIZING AND SELECTION OF LIGHT IMAGES

[75] Inventor: Lucien Guyot, Paris, France

[73] Assignee: Thomson-CSF, Puteaux, France

[21] Appl. No.: 342,281

[22] Filed: Apr. 24, 1989

[30] Foreign Application Priority Data

Apr. 27, 1988 [FR] France ................. 88 05591

[51] Int. Cl.$^5$ ........................... H01J 40/00
[52] U.S. Cl. ..................... 250/213 VT; 313/537
[58] Field of Search .......... 250/213 VT, 207; 313/537, 529

[56] References Cited

U.S. PATENT DOCUMENTS

| | | | |
|---|---|---|---|
| 2,919,377 | 12/1959 | Hanlet | 250/213 VT |
| 2,943,206 | 6/1960 | McGee et al. | 250/213 VT |
| 3,310,678 | 3/1967 | Kylander et al. | 250/213 VT |
| 3,335,284 | 8/1967 | Parks | 250/213 VT |
| 3,479,516 | 11/1969 | McGee et al. | 250/213 VT |
| 4,134,009 | 1/1979 | Dippold | 250/213 VT |
| 4,350,919 | 9/1982 | Johnson et al. | 250/213 VT |

FOREIGN PATENT DOCUMENTS 1215297 12/1970 United Kingdom .

OTHER PUBLICATIONS

Journal of Scientific Instruments (Journal of Physics E), Series 2, vol. 2, No. 1, Jan. 1969, pp. 41–44, B. L. Morgan et al.: "A Storage Tube for Optoelectronic Computing".
Journal of Scientific Instruments, vol. 43, No. 3, Mar. 1966, pp. 153–159; J. D. McGee et al.: "A Dynamic Electron Image Information Store".

Primary Examiner—David C. Nelms
Assistant Examiner—Michael Messinger
Attorney, Agent, or Firm—Oblon, Spivak, McClelland, Maier & Neustadt

[57] ABSTRACT

The disclosure concerns the observations of very fast light phenomena. It is desired to temporarily store a series of images arriving at a fast rate (one every 10 nanoseconds) for a duration (one microsecond) that gives enough time receive an order of selection of an image which is worthwile for analysis. The other images, which had been stored solely in case one of them might be interesting, are eliminated as and when they are not selected. An electron tube is used for the conversion of light images into packets of electrons. Each packet represents an image. The packets move in the tube from one end to the other, behind one another. The method and device disclosed make use of the property that these packets of electrons have, of moving far more slowly than light if the electrical fields in the tube are weak. It is therefore possible to temporarily store a large number of images in the form of these packets of electrons travelling in the tube for a duration which may be one microsecond. At the end of the trip, a selection grid enables a desired image to be selected and sent to the output face of the tube.

11 Claims, 3 Drawing Sheets

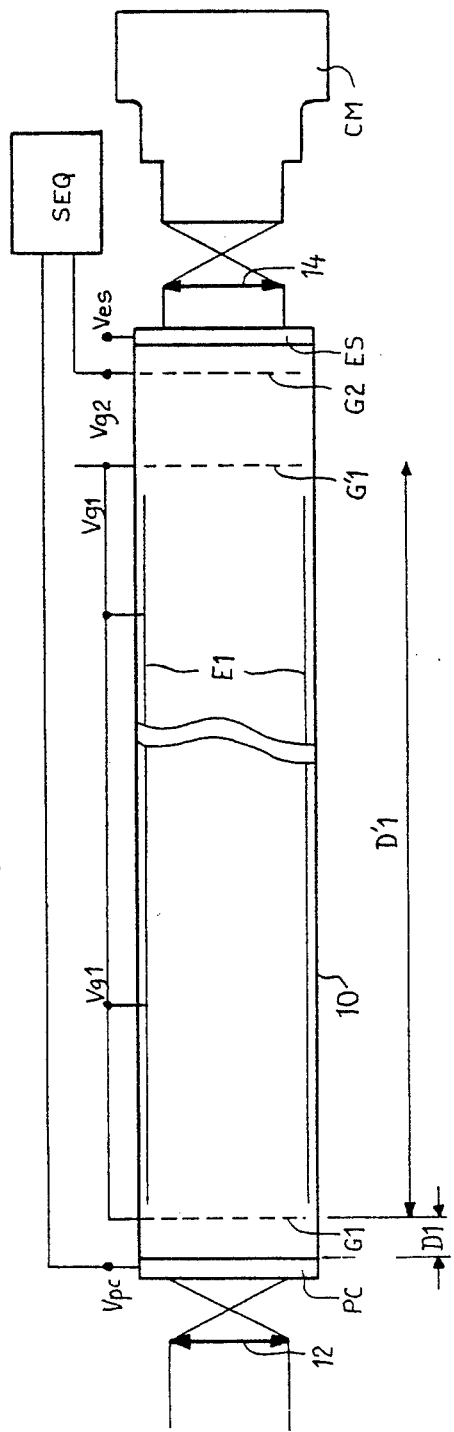
FIG_1
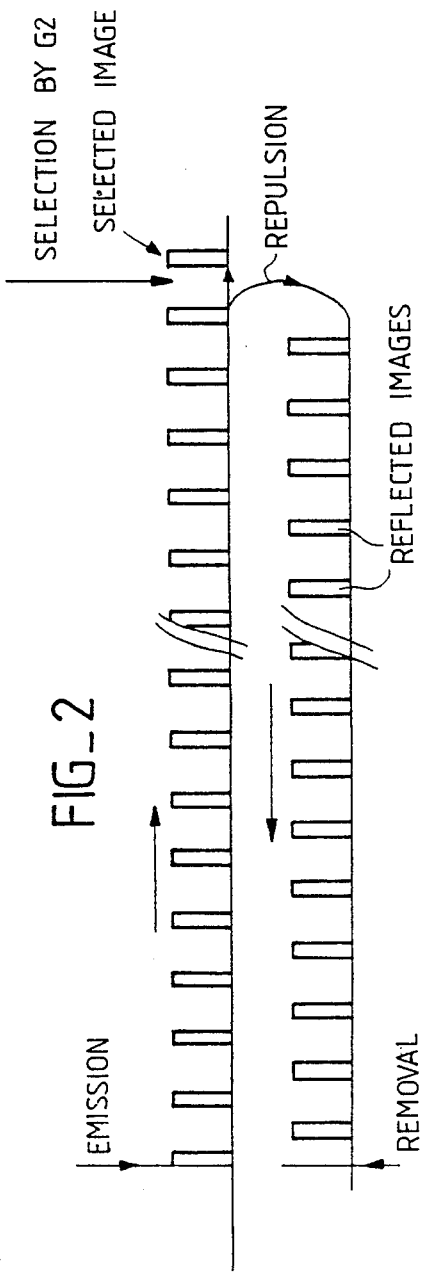
FIG_2

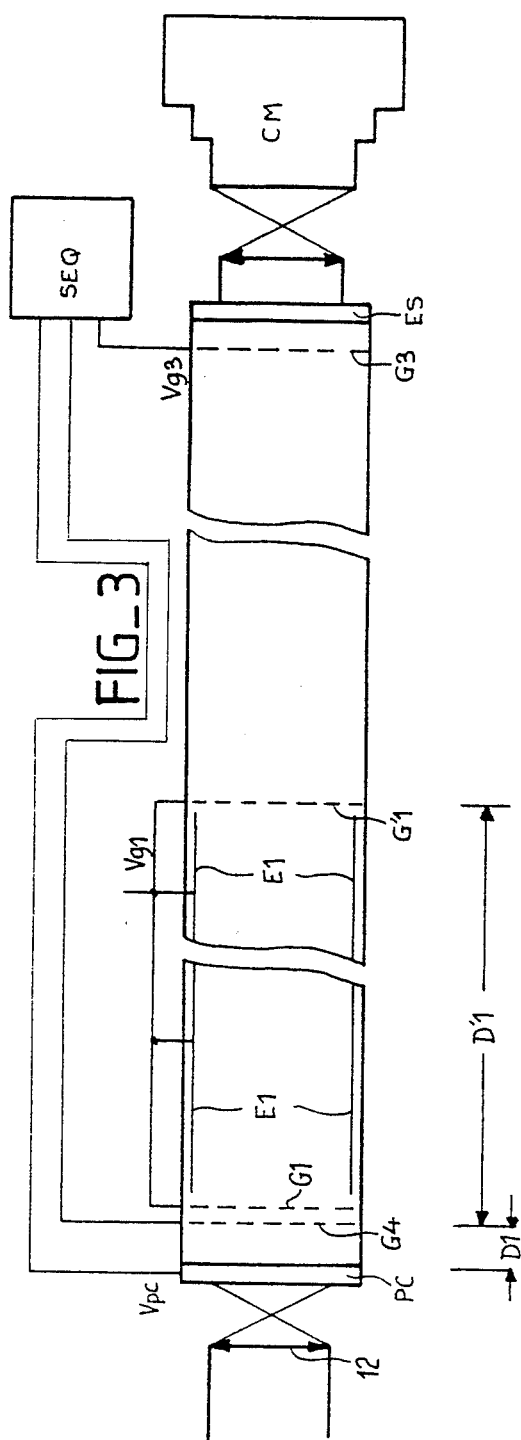
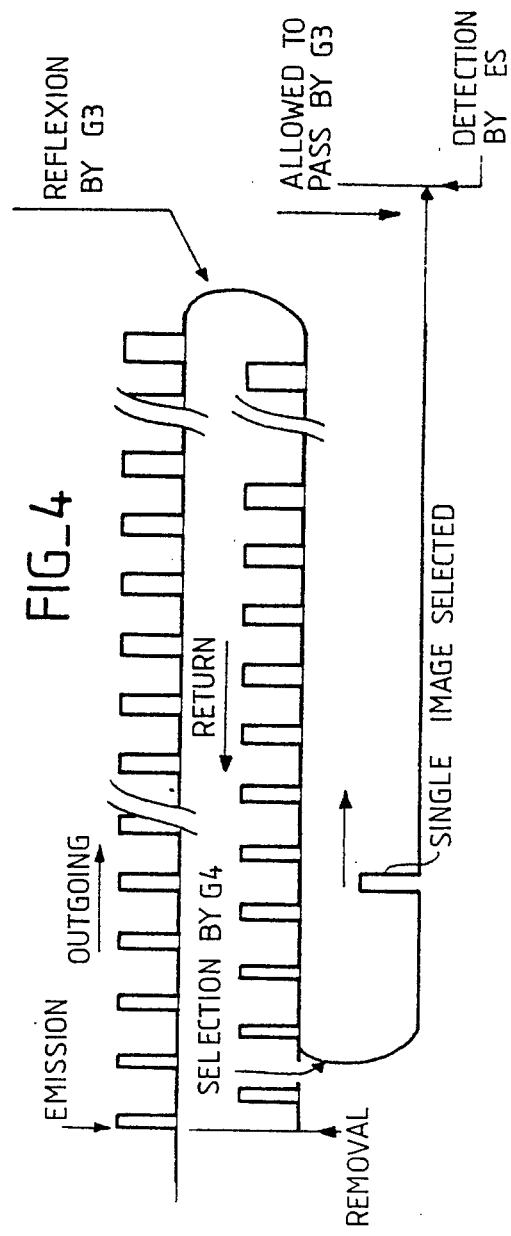

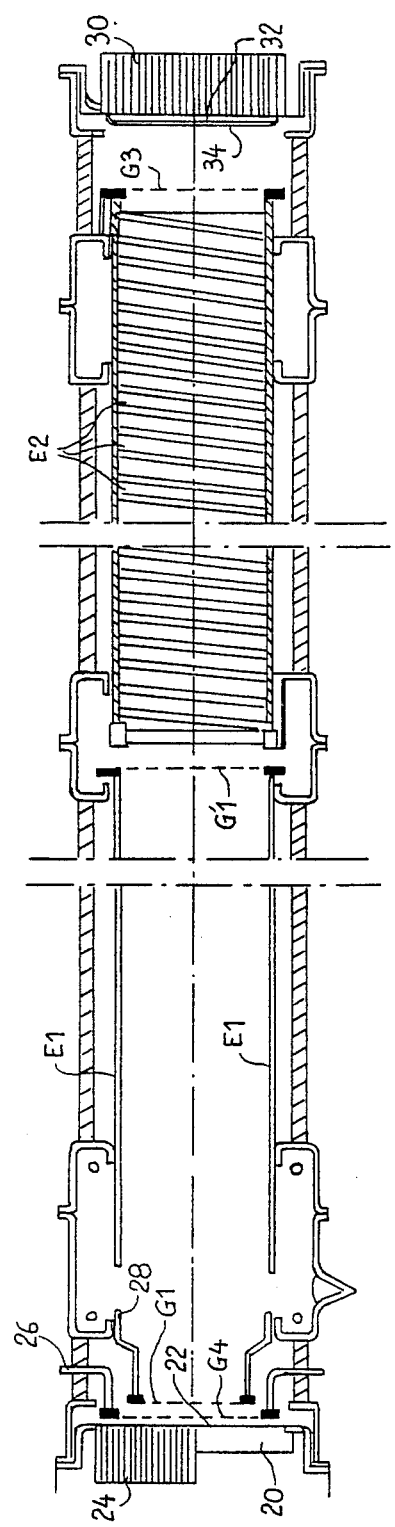
FIG_5

ELECTRON TUBE FOR THE DETECTION, MEMORIZING AND SELECTION OF LIGHT IMAGES

BACKGROUND OF THE INVENTION

1. Field of the Invention

The invention concerns the observation of very rapid luminous or light phenomena.

2. Description of the Prior Art

Ultra-fast recording cameras are used to observe these phenomena. These ultra-fast cameras are adapted to the high rate of the images to be analyzed and to the light flux available for each image.

If the phenomena to be analyzed occur very rapidly, the image periods become very short and the light flux of each image also becomes very low as a rule.

It then becomes necessary to introduce one or more image intensifiers into the chain of analysis. This enables the obtaining of a sufficient output signal which goes, either to a photographic film or to an image analyzer (television camera tube or charge transfer device for example).

The difficulty that arises is the following one: the pictures succeed one another very quickly, at a rate that is greater than the possibilities of analysis of the images at the output of the television camera. It is therefore sought to select certain images that are more useful than others, and the effort of analysis is concentrated on these pictures. However, for this, there should be the ability to make a very fast selection of the useful image among the images which go past at high speed and to direct the useful image towards means of analysis, in eliminating the other ones.

To illustrate the problem in concrete terms, we shall give a numerically illustrated example in a context where it is sought to analyze pictures coming from the detection of collisions of particles accelerated in an accelerator used for studies in nuclear physics, these collisions being displayed by means of scintillators.

The light images are observed in several directions and it is sought to analyze images at regular periods of about 10 nanoseconds.

However, all the images do not need to be recorded definitively with a view to very intensive analysis. Besides, this could not be done in view of the enormous quantity of information represented by the fact that there is an image every 10 nanoseconds, especially if, in practice, a simultaneous recording is made of a large number of images resulting from the observation of the phenomenon in a large number of different directions.

Consequently, the useful images are selected in order in order to be recorded. For this, a computer gives an indication on the need to make a special analysis of such and such an image. However, it cannot give this indication immediately. It gives it, for example, with a delay of one microsecond.

It is therefore necessary to temporarily store about a hundred images when the computer decides that one of them is useful and should be permanently recorded or sent towards means of analysis.

A possibility could be envisaged where the arrival of the images coming towards the television camera or image intensifier would be delayed by one microsecond, so that the images to be intensified would be received synchronously with a signal indicating that such and such an image is useful and should be stored with a view to analysis. For this purpose, it is possible to simply provide for optic fibers between the production of light images and the camera, these optic fibers being long enough to delay the transmission of the image. Calculations show that, to delay the images by one microsecond, there should be a fiber length of at least 200 meters, thus raising difficult problems when there are tens of thousand of fibers which undergo the same delay.

The other idea that comes to mind is that of routinely recording all the images that arrive during the period of one microsecond. At the end of this period, a validation signal, indicating that a useful image has to be analyzed, is either received or not received. If this signal is received, the useful image is preserved and the others are eliminated. If no validation signal is received, the images are eliminated, and the system again becomes available to receive a fresh sequence of images. However, there is no way known to make very high speed recordings of a large quantity of images: the figure of 100 images to be recorded with a camera during a period of one microsecond is not realistic at the present time.

SUMMARY OF THE INVENTION

The present invention proposes a new method and a device enabling the storage of a sequence of images arriving at a fast rate, and then the selection of one of these images, with a view to analysis, and elimination of the other images. This method should enable the receiving of successive images at a rate of one every ten nanoseconds, their retention in memory for about one microsecond until the reception, if any, of a selection signal within this period, the regular elimination of non-selected images and the recording of the selected image if any. The numerical values are given by way of indication.

The method according to the invention consists basically in:

focusing the light images at the input of an image converting electron tube;

converting the light images into electronic images in the form of packets of electrons moving in the vacuum within the tube;

giving these packets of electrons, by the application of a low-amplitude, accelerating electrical field, a known speed of motion which is very low as compared with the speed of light;

creating, in a section of the tube, by means of a selection electrode, an electrical field controlled by a selection logic signal, said field having either a first value for which the electrons are pushed back by the electrode towards the interior of the tube, or a second value for which the electrons can go through the electrode, the selection logic signal being produced in synchronism with the arrival of a packet of electrons to be selected in the vicinity of the selection electrode, the instant of arrival being related to the speed of motion of the packets of electrons;

and finally, producing, at the output of the tube, an electronic image by means of packets of electrons selected by the logic signal, and eliminating the non-selected packets of electron.

Hence, use is made of the property that electrons have, like any electrical charged particle, of being capable of being accelerated in varying degrees depending on the amplitude of the electrical field in which they move, so that the transit time of an image in the form of a packet of electrons within the tube can be adjusted to a considerably greater value than the transit time of light over the same distance. Bundles of optic fibers, several tens or hundreds of meters long, may be replaced by a tube of a few hundreds of centimeters to achieve the same delay in transmission and a possibility of image selection.

The selection electrode will most usually be a grid which is transparent to electrons, but it may also be a photocathode used to produce the packets of electrons. This is why the generic term "electrode" has been adopted.

Thus, a sequence of images can be made to enter the tube at a high rate. These images, converted into electron packets, will move relatively slowly in the vacuum within the tube. The transit time of the images, which is equal to the integral of the speed of the electrons over the distance travelled, may be far greater than the period between two successive images, even with a small tube length.

For example, arrangements can be made to have a transit time of the order of one microsecond with a tube that is not bigger than about 60 centimeters. About one hundred electron packets, spaced out in time at intervals of about 10 nanoseconds and in space, at distances of some millimeters, may transit simultaneously within the tube, which thus forms a volatile memory temporarily storing about a hundred images in motion. The working is somewhat similar to that of a shift register. The motion is continuous and the images, that have entered first, come out after a storage cycle, while new images enter regularly.

If a useful image has to be selected with a view to an analysis, there is thus one microsecond available to give the order of selection.

The order is given in the form of a logic command on the potential of a selection grid. If an order is given, the potential assumes a first value. If no order is given, the potential assumes a second value. In one of the two cases, the potential will generate a repellent electrical field, and the electrons will follow a path which will make them return backwards. In the other case, the potential will permit the passage of electrons through the grid and the electrons will follow another path.

It will be seen that, depending on the location of the grid, the potential may be repellent in the presence of a selection order or, on the contrary, repellent in the absence of a selection order. In any case, one of the paths of the electrons will finally end at an output device where the selected packet of electrons forms an electron image which can be analyzed. The other path will finally end at a collector electrode which removes the non-selected packet of electrons.

The image selection and temporary storage device according to the invention therefore comprises an electron tube, including an input section enabling the conversion of a light image into an electronic image in the form of packets of electrons, a storage section wherein the electrical fields are such that the electrons move at very low speeds as compared with the speed of light, a selection electrode taken to a potential that is capable of assuming one value or another under the control of a selection logic signal, one of the potential values enabling the electrons that come towards the electrode to be pushed back and the other potential value enabling the electrons to pass through the electrode, a means for the removal of the non-selected packets of electrons and, finally, an output section with a means to reconstitute an electron image from a selected packet of electrons; the selection logic circuit being applied with a very precise temporal shift with respect to the instant of input of an image to be selected, the shift corresponding to the transit time of the packet of electrons from the input section to the storage section and, in the storage section, up to the vicinity of the selection electrode.

It can be planned that the selection electrode is placed at that end of the tube which is opposite the input section. The electrons then transit throughout the length of the tube. Upon arriving at the selection electrode (preferably a grid), they are reflected and sent back to the input section which also acts as a removal means. However, if a selection signal is applied to the grid at a given instant, the packet of electrons goes through the grid and forms an electronic image on the output face. This image may be reconverted into a light image, or may be directly recorded or processed in electronic form.

However, in order to take into account the fact that, in one and the same electron packet emitted during the input conversion, the individual electrons have energies with spread values and, therefore, to take into account the fact that their speeds of motion are not the same in the presence of one and the same acceleration, it is preferred to provide for the trip of the electrons to have at least one outgoing stage and one return stage in the tube between the input section and the selection grid.

In other words, the electrons are emitted in the tube during the conversion of a light image into an electron packet. This packet is accelerated and gets spread in space owing to the initial spread energy values of the electrons. Initially, it is slightly accelerated, and then it is slowed down in a field which is sufficiently decelerating for the electrons to stop and then set off again back towards the selection grid. During this return trip, the scattered or "unpacked" packet of electrons gets "repacked" or reassembled. The selection grid is located in a zone where the electrons are repacked to the maximum. Thus, mixtures of electron packets, corresponding to successive images that are close to one another, are avoided. The choice of the value of the decelerating field enables the braking and backward acceleration time of the electrons to be adjusted. It affects the maximum repacking position of electrons with different energy values.

In this case, the selection grid will be generally located close to the input section of the tube, the transit time of the electrons being the time taken for the to-and-fro motion in the tube. The selection grid is then ordered to reflect the selected electron packets frontwards and to let through the unselected packets. The selected packets re-travel a frontward path until an output section opposite the input section. There, an output grid is temporarily taken to a potential which enables the selected packet to be let through instead of reflecting it backwards. The packet may then form, on the output surface, an electronic or light image to be analyzed or recorded. The output grid may, besides, be formed solely by one electrode of the output face.

In the entire description, the term "frontward direction" designates the direction from the input face towards the output face of the tube, corresponding to an "outgoing" trip of the electrons. The term "backward direction" designates the reverse direction, from the output face towards the input face of the tube. It corresponds to the return trip of the electrons after they have gone through the tube for the first time.

In practice, it could be planned that the means for removing the non-selected electron packets will consist of means for the conversion of light images into electronic images, i.e. in practice, using a photocathode which then simply plays the role of a collector electrode. If a photocathode generates the electron packets from a light image, this photocathode may also serve, when its potential is taken to an appropriate value, as an electrode for the removal of packets of electrons that do not correspond to a selected useful image.

In this case, it is desirable for the image conversion means not to work permanently. It is preferable to achieve a conversion of input images into electronic images at instants that do not coincide with the return of the unselected electron packets. The duration of the to-and-fro trip of an electron packet between the input tube and the removal section is thus chosen in such a way that the electrons return to the removal electrode at an instant which does not correspond to a light image conversion. The length of the tube and the potentials applied to the acceleration and deceleration grids are chosen accordingly.

The selection electrode may, in certain cases, be formed by the photocathode itself rather than by a grid placed before the photocathode. If the potential of the photocathode is temporarily taken to a sufficiently negative value, it acts as a reflector to the electrons that return to it after a to-and-fro trip. It thus enables a selected packet to be sent frontwards. However, certain precautions then have to be taken since the photocathode will then emit a packet of electrons representing a new image (unless the illumination of the photocathode has not been prohibited at this instant).

BRIEF DESCRIPTION OF THE DRAWINGS

Other characteristics and features of the invention will appear from the following detailed description, which is made with reference to the appended drawings, of which:

FIG. 1 shows a schematic view of a device for the selection and temporary storage of images according to the invention, when the transit time of the electron packets before selection corresponds to the time taken for the outgoing trip by the electrons from the input face to the output face of the tube;

FIG. 2 gives a schematic view of the trip made by the packet of electrons in the tube of FIG. 1;

FIG. 3 gives a schematic view of the device according to the invention when the transit time before selection corresponds to a to-and-fro trip by the electron packets in the tube;

FIG. 4 gives a schematic view of the trip of the electron packets in the tube of FIG. 3;

FIG. 5 gives a sectional view of a detailed embodiment of the tube according t the invention.

DESCRIPTION OF A PREFERRED EMBODIMENT

FIG. 1 shows a schematic longitudinal view of a vacuum electron tube which provides for an explanation of the basic principles on which the present invention is based. The case of FIG. 1 corresponds to the simple case where the useful storage time of the electron packets corresponds only to a simple outgoing trip and not to a to-and-fro trip in the tube (only those electron packets which are not useful return).

This electron tube 10 is formed like a light image intensifier tube, with an input face which is a photocathode PC on which it is possible to focus a light image using any optical means, symbolized herein by an optical lens 12.

When the photocathode is taken to a sufficient negative potential with respect to the other electrodes of the tube, it emits electrons from each point of its surface. As a null potential reference, we shall take the potential Vpc of the photocathode in its stage of emitting an electron packet representing an image.

The number of electrons emitted at each point of the surface is all the greater as the illumination of this point is more intense. The local emission of electrons is thus done with a density representing the local luminous density at this point of the image. Consequently, an electron packet emitted during a given interval of time represents, in electronic form, the light image focused, during this interval of time, on the photocathode. This packet will move in the tube while preserving the image information that it represents. If it is selected, it could restore this information on the output face.

The images can arrive continuously or discontinuously: the detection of an isolated image consists of the production, by the photocathode, of a packet of electrons which will move in the tube. The detection of the following image will produce another packet of electrons, and so on. If the images arrive continuously, it is possible, by the choice of the potential of the photocathode, to interrupt image detection or to permit it. Should the images arrive discontinuously, there is no need to act on the potential of the photocathode to produce a discontinuous succession of electronic images. Each image lasts, for example, two to three nanoseconds for an interval, between images, of 10 nanoseconds.

The output face of the tube is formed by a cathodoluminescent layer ES or, more generally, by a layer sensitive to electrons and capable of producing an image, each point of which represents the number of incident electrons at this point. This image is such that it can be photographed by a camera, or else analyzed by electronic means: it can be imagined, for example, that the output face is an electrosensitive layer of a camera tube or a solid state analyzer (a charge transfer device) so that the electronic image present on the output face can be directly converted into a video signal.

In the vicinity of the photocathode PC, an acceleration grid G1 is placed. Its potential is constant and equal to VG1. The distance D1 between the photocathode and the grid G1 is small compared with the length of the tube and the difference between the potential Vg1 of the gate G1 and the potential Vc of the photocathode is small, for example a few volts.

The accelerating field is therefore weak in the so-called acceleration zone, and the electrons acquire very low speed compared with that of light.

Beyond the gate G1, there is a zone that shall be called a "gliding zone" which is a zone where the electrons are neither accelerated nor decelerated. The potential in this zone is kept equal to Vg1 over a distance D′1 which may form the major part of the remaining length of the tube up to the output face.

The potential is maintained in the gliding zone by means of peripheral electrodes E1, at the potential Vg1, and by a grid G′1 which terminates the gliding zone and is also at the potential Vg1. The electrical field is therefore null and there is no acceleration or deceleration of electrons.

Beyond the grid G′1, terminating the gliding zone, there is a selection grid G2 carried to a potential which may vary under the command of a logic selection signal.

In a first state, the logic signal corresponds to a repulsion potential (a sufficiently negative potential) which brakes the electrons and sends them back to the photocathode.

These electrons, which are sent back and which correspond to non-useful images, are then absorbed by the photocathode. Besides, this photocathode may be taken to a positive potential each time a packet of electrons reaches it, to facilitate the recovery of the electrons.

In a second state, the potential of the selection gate G2 is such that the electrons are not braked or are braked only a little. They go through the selection gate and strike the output face ES on which they form a useful image which may be analyzed or recorded.

It is possible to make a very precise calculation of the transit time of an electron packet between the instant when it is produced on the photocathode PC and the instant when it reaches the vicinity of the grid G2. This time is dictated by numerous factors, which are:

the initial energy of the electrons emitted by the photocathode, hence their initial speed;

the value of the electrical field of acceleration in the acceleration zone and the length D1 of this zone;

the length D'1 of the gliding zone without a field;

as the case may be, the value of the electrical field between the grids G'1 and G2 and the distance between these grids, to compute the residual time between the passage of an electron through the grid G'1 and arrival in the vicinity of the grid G2.

The initial energy of the electrons depends on the nature of the material forming the photocathode and the illumination wavelength. It is about one electron/volt for the materials habitually used in the visible or ultraviolet range, and it corresponds to an ejection speed of about 600 km/s. However, it is spread around this value as shall be seen further below.

The field in the acceleration zone is fixed by the ratio between, on the one hand, the difference in potential Vjl-Vpc between the gate G1 and the photocathode and, on the other hand, the distance D1 between these two electrodes. The difference is positive and the field is an accelerating field.

The period T1 taken by the electrons to travel in the acceleration zone can be computed. It is equal to:

$$T1 = 2D1[(1 + V0/Vg1)^{\frac{1}{2}} - (V0/Vg1)^{\frac{1}{2}}]/(2eVg1/m)^{\frac{1}{2}}$$

where e is the charge of the electron, m is its mass, V0 is the potential of extraction of an electron outside the material forming the photocathode for the light wavelength considered.

The speed of the electron in passing through the grid G1 can also be computed. In the presence of a constant acceleration, the speed grows linearly from the initial speed u0 to the ejection instant $(u0 \times (2eV0/m)^{\frac{1}{2}})$ until a speed u1, with:

$$u1 - u0 = T1(Vg1 - V0)e/mD1$$

The speed of the electrons then remains constant, equal to u1, throughout the gliding zone, since the electrical field is null in this zone.

It is therefore possible to make a precise computation of the time taken by the electrons to cross this zone of a length D'1. This period T'1 is given by:

$$T'1 = D'1/u1$$

which can also be written:

$$T'1 = D'1(1 + V0/Vg1)^{-\frac{1}{2}}/(2eVg1/m)^{\frac{1}{2}}$$

According to the invention, the selection grid G2 is taken to a sufficiently positive potential when an image has to be selected for an analysis. If Ti is the instant at which an electron image is formed on the photocathode, the potential of the grid G2 is modified at an instant Ts which is shifted, with respect to Di, by a period essentially related to the value T1+T'1. For the rest of the time, the potential of the selection grid G2 is negative enough to push back the packets of electrons when they come out of the gliding zone and send them back towards the photocathode where they will be eliminated.

Of course, in view of the inherent characteristics of the tube and, more particularly, of the distance between the grids G'1 and G2 and of their respective potentials, it may be necessary to shift the instant at which the potential is modified with respect to the theoretical value Ti+T1 by a period Td: in effect, the time taken by the electrons to get braked and then pushed back by the selection grid towards the gliding zone has to be taken into account.

The packet of electrons selected at the instant Ts (with Ts=Ti+T1+T'1+Td) goes through the grid G2 and, immediately afterwards, the potential of the grid G2 is brought to its initial repellent value. FIG. 1 shows a sequencer SEQ determining the respective instants Ti (creation of a new image) and Ts (application of a selection potential to the grid G2), to check the potentials of the photocathode and the selection grid.

The selected packet going through the selection grid G2 forms an image on the output screen ES which is placed beyond the grid G2 and forms the output face of the tube. The image formed is luminous if the screen ES is a cathodoluminescent, or it is electronic if the electrons form local charges on the screen. In this latter case, the screen is a charge accumulating target working, for example, by secondary emission of electrons. The image produced will be analyzed or recorded. FIG. 1 shows a means to focus this reconstructed light image in the form of a lens 14. The focusing is done, for example, at the input of a photographic camera CM.

Through the low potentials of acceleration present in the tube, a storage of moving images has been obtained in the tube during a relatively long period of about several hundreds of nanoseconds, for example, for accelerating potentials of a few volts and for tube lengths of several tens of centimeters. This duration is far greater than the transit period of an optical image in optic fibers several tens of meters long. Some tens of images can move simultaneously in the tube, shifted temporally and spatially with respect to one another.

If the output screen ES requires the electrons to be greatly accelerated (to create light-generating impacts for example), it can be easily taken to a positive potential Ves of several thousands of volts which will not interfere with the electrical fields in the tube, owing to the screen which forms the grid G2 with respect to the interior of the tube.

However, if the screen can work even with very low speeds of electron impact, it is possible, if necessary, to consider eliminating the grid G2, with the screen ES itself playing the role of a selection grid in being taken either to a repellent potential to eliminate the non-selected packets of electrons or to a slightly repellent potential to permit the arrival of a selected packet of electrons.

The packets of electrons sent back by the grid G2, when they are not selected, again cross all the space between the grids G2 and G'1, then the gliding zone between the grids G1 and G'1, then the zone between the grid G1 and the photocathode. They are absorbed by the photocathode which acts as a collector electrode to ensure their removal.

It may be provided that the photocathode is taken to a slightly positive potential each time that a packet of electrons returns to be eliminated. The removal of the packets is thus done more efficiently. But then, the instant at which the packets of electrons arrive does not coincide with the instants Ti at which it is sought to generate new images. In effect, the positive potential of the photocathode would prevent the formation of new packets of electrons.

It is therefore seen to it that, in this latter case, the instant at which the packets of electrons to be eliminated return (this instant can be calculated with precision in the same way as the time of the outgoing trip by the packets is calculated) is located between two successive instants Ti for the formation of new electronic images on the photocathode.

FIG. 2 symbolizes the packets of electrons which move simultaneously in the tube and are shunted by the selection grid either to the output screen or, in a return trip, to the photocathode.

To end the description of FIGS. 1 and 2, it should be pointed out that it is quite desirable for the interior of the tube to be subjected to an axial magnetic field which has the effect of bringing together, on one and the same trajectory, and of focusing, on one and the same point, all the electrons emitted from one and the same point of the photocathode, thus rectifying the paths of the electrons emitted in a direction that is not perpendicular to the surface of the electrode.

We have thus described the basic principles of the present invention with reference to a simple example.

It may be noted that the transit time of the packets of electrons can be adjusted by varying the acceleration potential Vg1.

We have thus described a simple example of the basic principles of the present invention.

We shall now describe an embodiment wherein the useful storage time of the electrons lasts for one to-and-fro trip of the electrons in the tube, the selection being done at the end of the to-and-fro trip.

The construction of the tube and the explanations are more difficult, but the importance of this embodiment arises out of the feature wherein it enables taking into account the fact that the electrons emitted by the photocathode do not all have the same initial energy. The mean energy of the electrons of a packet is V0 (electron volts) but the individual electrons have initial energy values that are statistically spread around V0. The spread may be 30% or 40% and, besides, it is not known with great precision.

The electrons of a packet are accelerated in the acceleration zone between the photocathode and the grid G1. The acceleration is the same for all the electrons. But the initial speed u0 is not the same for all. The speed of arrival in the gliding zone is, therefore, not the same for all.

In this gliding zone, the electrons keep the speed acquired by them when they cross the grid G1. Those emitted by the photocathode with an speed u0 acquire a speed u1 and keep it in the gliding zone. Those which have been emitted by the photocathode with an initial speed u'0 acquire a speed u'1 and keep it in the gliding zone.

It is therefore understood that two electrons of one and the same image, emitted at a given instant but with two different energy levels, move away from one another during this trip in the acceleration zone and the gliding zone instead of staying together.

At this stage, it is important to make the following observation: this phenomenon where the packet of electrons, corresponding to one and the same image, undergoes "unpacking" or scattering is known. It occurs in all light image intensifier tubes. But it does not usually create any problems because the electrons are very strongly accelerated and acquire speeds which are far greater than their initial speed so that the small difference in the initial speed is not significant upon arrival.

On the contrary, this phenomenon of unpacking becomes important in the present invention, where the electron acceleration potentials are of the same order of magnitude (some volts) as the initial energy levels of the electrons of the photocathode, the starting energy values being capable of undergoing a spread of ±20% around the mean value.

We shall see how this problem is resolved in an optimal way according to the invention.

FIG. 3 gives a schematic view of the internal arrangement of the tube with its different grids. In this figure, the photocathode PC, the grid G'1 and the electrodes E1 of the gliding zone, the screen ES and focusing means 12 and 14 bear the same references as in FIG. 1 and play similar roles.

The acceleration zone immediately downstream of the photocathode PC is here again very short as compared with the overall length of the tube. Its length has again been designated by D1.

The gliding zone with constant potential Vg1, which follows the acceleration zone, no longer occupies any more than substantially half the length of the tube instead of occupying it almost entirely. Its length is designated by D'1.

The gliding zone is followed by a deceleration zone wherein a substantially uniform electrical field is established. This field tends to brake the electrons until it stops them and re-accelerates them in the reverse direction.

The deceleration field is set up through a difference in potential between the electrode G'1 (which marks both the end of the gliding zone and the start of the deceleration zone) and an electrode G3 located at the end of the deceleration zone. The potential Vg3 of the electrode G3 is more negative than the potential Vg1 of the electrode G'1. The value of the deceleration voltage is chosen in such a way that the electrons of a packet are all braked until they stop before reaching the electrode G3, and in such a way that this happens irrespectively of their original speed on entry into the deceleration zone, i.e. irrespectively of their initial energy at the output of the photocathode. Consequently, the potential Vg3 should be smaller than −V0max, if +V0max is the potential corresponding to the maximum initial energy of the electrons outside the photocathode.

It shall be explained further below that the grid G3 does not have only a role in setting up a deceleration field. It also has the role of an output grid controlled by a logic signal to let through selected electron packets towards the output face. In the following paragraphs it is assumed, first of all, that the grid G3 sets up only the deceleration field.

Depending on whether their initial speed is higher or lower, the electrons stop closer to or further away from the deceleration zone but, in any case, they stop and go back in reverse direction with a return acceleration of a value which is dictated by the value of the deceleration field.

On the outgoing trip, the electrons underwent a phenomenon of "dispersal" or "unpacking" due to their different initial speeds. During the deceleration and return, they tend to get recombined or "repacked". Those electrons that went faster on the outgoing trip went further and they take longer to return.

It can be shown by calculation that there may be one region of the tube, located between the deceleration zone and the input face, such that the electrons are repacked to the maximum extent in this region provided, however, that a sufficient length is chosen for the deceleration zone. The position of this region depends on several factors and, more particularly, on the length of the gliding zone and the value of the acceleration and deceleration fields, and it can be seen to it that they are located in the vicinity of the input face.

In this favored zone, a selection electrode will be placed. This selection electrode will be designed to shunt the electron packets, corresponding to useful images for analysis, and the electron packets, corresponding to unnecessary images which have to be eliminated, along different paths.

The role of the selection electrode is precisely that of letting through, towards the photocathode, electron packets returning from the deceleration zone (unselected packets) or, on the contrary, that of again reflecting a selected packet frontwards to make it go again through the acceleration zone, the gliding zone and the deceleration zone.

The photocathode could fulfill this selection role, since it suffices to take this photocathode to a positive potential sufficient for it to absorb electrons and to carry them to a negative potential sufficient for it to reflect them frontwards.

According to the invention, it is preferred to use a separate selection electrode G4. This electrode is placed at the distance D1 from the photocathode, namely at the place defining the end of the acceleration zone and the start of the gliding zone. It is carried to the potential Vg1 when no selection has to be made of an electron packet, and it then clearly defines the start of the gliding zone. It is carried to a negative potential when a packet of electrons circulating in the return direction has to be selected.

The grid G1 of FIG. 1 may be eliminated or placed immediately behind the grid G4 and carried to the constant potential Vg1.

It is thus possible to see the working of the delayed selection of an image in a sequence of images at a fast rate: the images arriving at a fast rate are converted into electron packets separated from one another in time and in space. The packets move frontwards at a relatively low speed. At the same time, they get dispersed or "unpacked" spatially, since the faster electrons go further than the slower electrons. Then the packets are reflected by the grid G3 towards the rear of the tube, still quite slowly. They reassemble, or get "repacked" during their return trip towards the grid G4. On reaching the grid G4, they are spatially and temporally repacked to the maximum extent. At this place, the risk of two packets of electrons, corresponding to two successive images, getting mixed up is therefore minimal. The selection electrode G4 therefore enables a selection of a packet to be set up with precision, without encroachment on the preceding or following packet. The to-and-fro transit time of the packets of electrodes in the tube has lasted long enough for the grid G4 to have had the time to receive a selection control signal in the form of a change in its potential level. This transit time of a packet of electrons is known with great precision as a function of the different characteristics of dimensions and potentials of the tube. The non-selected packets go through the grid G4 and fall again on the photocathode where they are absorbed and removed. A selected packet is reflected frontwards by the grid G4 at negative potential, and it will be directed towards the output face.

This is what is summarized in FIG. 4.

When a selected packet of electrons is reflected frontwards, the creation of new packets of electrons by the photocathode is prohibited. This is easy during the reflection process itself, because the negative potential of the grid G4 prevents this production. However, it is prohibited also during the period which follows the reflection, by taking the photocathode to a higher potential than the potential Vg1 of the grids G1 and G4.

For, it is preferable, then, to prohibit the production of new packets of electrons not only for the duration of a single image, but for several durations of images so as to properly isolate the selected packet of electrons.

It is even possible to provide for the photocathode to be thus inhibited in its operation for a certain period of time before the packet to be selected comes towards the grid G4 and practically throughout the period of time that will be taken by the packet of electrons selected to reach the exit of the tube, or at least for it to reach the exit of the gliding zone. It is only afterwards that a new creation of packets of electrons will be permitted.

The isolation is thus achieved to the front and to the rear of the selected packet. It will not get mixed up with other packets during its second outgoing trip from the input face to the output face. Furthermore, behind it, there will be no new packets emitted by the photocathode: the motion of such new packets would be disturbed during the outgoing of the selected packet through the electrode G3.

The selected packet crosses the entire tube again, and the potential of the grid G3 is changed, while it is in the deceleration zone between the grids G'1 and G3, so that it is no longer stopped by the decelerating field. Of course, the potential of the grid G3 is changed only when the last packets of electrons, emitted by the photocathode before selection, have undergone their deceleration, stopping and backward return stage.

Therefore, only the selected packet is transmitted towards the output face of the tube. This packet forms a visible image on the output face if it is formed by a cathodoluminescent layer. It may also form an electronic image if this face is formed, for example, by a capacitive layer such as the target of a scanning camera or by a charge transfer matrix.

Just as a calculation was made, in the case of FIG. 1, of the transit time of the packet of electrons from the moment when they are produced to the moment when they reach the vicinity of the selection grid, it is also possible to calculate the transit time in the case of FIG. 3.

This period includes the same periods T1 and T'1 as in FIG. 1, to which there should be added:

a period of time T2 of braking until stoppage in the deceleration zone;

a period of time T'2 of re-acceleration in the reverse direction in the same zone until return to the gliding zone;

a period of time T3 equal to the transit time T'1 at constant speed in the gliding zone. T3 is equal to T'1.

The sum of the periods T2 and T'2 varies proportionately to the square root of the quantity (1+V0/Vg1), it being recalled that V0 is the energy of extraction of an electron from the photocathode, and Vg1 is the potential in the gliding zone. More precisely:

$$T2+T'2=[2D2(1+V0/Vg1)^{\frac{1}{2}}]/[(2eVg1m)^{\frac{1}{2}}(1+Vg3/Vg-1)]$$

D2 is the distance between the electrodes G'1 and G3, and Vg3 is the potential of the grid G3, the decelerating field having a uniform value (Vg3−Vg1)/D2.

The transit time of a packet of electrons from its emission by the photocathode, followed by its to-and-fro trip in the tube, to its arrival at the gate G4 may therefore be calculated precisely. Besides, it is noted that it depends on the potentials G4, G1, G'1, on the one hand, and G3 on the other hand, and this operation can thus be adjusted as a function of the desired periods of time.

The instant at which a modification of potential has to be applied to the grid G4, after the instant Ti of the production of an image to be selected, is the instant:

$$Ts=Ti+T1+T'1+T2+T'2+T3-'$$

where D' designates an interval of time taking into account the fact that it is necessary to control the change in potential of the grid G4 before the packet to be selected actually reaches this grid.

Without going into the details, it can be indicated here that the equations giving T1, T'1, T2, T'2, T3 enable the determination of that position where the grid G4 has to be placed in order to achieve a selection of packets of electrons at the point where they are most assembled or repacked in time or in space. It can be observed that:

T1 is negligible compared with T'1 or T2 or T'2, since D1 is smaller than D'1.

T'1 varies in a substantially proportionate degree with the quantity (1−V0/2Vg1), whence the dispersal or "unpacking" phenomenon, this approximation being made in assuming that V0/Vg1 is relatively smaller than unity;

T2+T'2 would vary in a substantially proportionate degree with the quantity (1+V0/2Vg1), hence the phenomenon of reassembling or "repacking";

the factors of proportionality bring into play the potential and distances between grids, and they enable choosing the place at which an optimal "repacking" is achieved.

Generally, it would be preferable to achieve the "repacking" in the immediate vicinity of the photocathode, the selection grid G4 then acting at the same time as an acceleration grid when there is no selection.

The partial transit periods in the different zones depend on the values of the distances D2 and D'1 notably. They also depend on the initial energy V0 of the electrons. It is desired that, for different energies, the total transit time should be the same. It can be ascertained that the outgoing transit time T'1 in the gliding zone diminishes when V0 increases whereas, on the contrary, the total to-and-fro transit time in the deceleration zone (T2+T'2) increases when V0 increases. A compensation is therefore possible. One method to calculate the distances, enabling a compensation, is to choose two extreme values, V0min and V0max, of initial energies, and to choose the parameters that would enable the equalizing of the overall transit times from the photocathode to the selection grid as a function of the position chosen for the latter.

It will be ascertained that a compensation is possible on condition that a sufficient length of deceleration zone is provided for. This length (D2) is not negligible as compared with the total length of the tube, as shall be seen in the numerically illustrated examples given further below.

As indicated with reference to FIG. 1, every advantage will be had by making the tube work in a high axial magnetic field or by providing the tube with coils for the creation of an axial magnetic field of this type. In this way, the paths of the electrons are focused from one point of the photocathode on one point of the output screen irrespectively of the initial direction in which the electron is ejected.

We shall now summarize the working of the system in giving some numerical values for a better understanding of the way in which the different stages unfold.

The tube dimensions chosen in this numerically illustrated example are as follows:

diameter 50 millimeters;

distance between photocathode and grid G4: D1=1 millimeter, and grid G1 immediately behind;

distance between the grid G4 and the grid G'1: D'1=about 325 millimeters;

distance between the grid G'1 and the output face: about 230 millimeters. The grid G3 may be placed in the immediate vicinity (some millimeters, for example 5 to 10 millimeters) from the output face.

The photocathode is made, for example, of cesium antimonide $SpCs_3$, the initial energy of an electron being about one electron-volt in visible or near ultraviolet light.

A. Production of Images by the Photocathode

Two possiblities:

(a) Either the light images arrive discontinuously, for example one image with a duration of 2 to 3 nanoseconds every 10 nanoseconds.

the photocathode may remain permanently at a null potential;

the grid G4 is at a weakly accelerating potential Vg1 of the order of 4 volts;

the grid G1 is also at the potential Vg1 of four volts;

the grid G3 is at a repellent potential Vg3 of about −3 volts;

the transit time taken for the outgoing trip of an electron packet from the photocathode to the inside of the tube and the return trip to the selection grid G3 is about 995 nanoseconds. For this period of time, an intermediate value, between two consecutive multiples of the period (10 nanoseconds) between two packets of electrons, is chosen so that the return of the packets does not coincide with the emission of other packets.

(b) Or else the light images arrive continuously and the wave packets have to be made discontinuous by periodic inhibition of the photocathode;

the values of the potentials Vg1 and Vg3 are the same as above, namely +4 volts and −3 volts respectively;

the photocathode is at a null potential when an electronic image has to be generated in the form of a packet of electrons;

it is carried to a potential greater than about 5 volts (i.e. greater than Vg1+V0 if V0 is the potential corresponding to the energy of the electrons of the photocathode) when the extraction has to be inhibited. This inhibition preferably takes place regularly, for example, for 5 microsecond every 10 microseconds. It takes place, in any case, at the instant when the selection grid G4 reflects a selected packet of electrons, and it also takes place preferably some 10-nanosecond periods before and some periods after this selection command. The potential Vpc of the photocathode in the inhibition phase may be +8 volts for example.

B. Removal of Non-Useful Images at Return

The photocathode is periodically taken to a positive potential (for example, again +8 volts) whenever a packet of electrons has to be removed after it has again crossed the grid G4 on its return trip.

However, it is also possible to keep a null potential at the cathode and to periodically carry the grid G4 to a potential that is sufficiently positive to accelerate the packets of electrons returning to the cathode during intervals of time when there is no emission by the photocathode.

C. Selection of a Packet of Electrons

The order of selection of an image should be known within a period of a little less than 995 nanoseconds after the arrival of the light image at the photocathode. For example, the order is known at the end of 900 nanoseconds, the original point of the periods taken at the instant Ti of arrival of the light image.

Several periods before the arrival of the corresponding packet of electrons returning to the grid G4, for example at the end of a period of time equal to 955 nanoseconds, the photocathode is taken to a potential which is sufficiently positive (greater than Vg1 V0) to inhibit the photocathode.

Then, at the instant of arrival of the electron packet on the grid G4, for example, from the time 992 nanoseconds to the time 997 nanoseconds, the grid G4 is carried to a potential which is sufficiently negative, preferably smaller than (−Vg1+V0), where Vg1 is the potential of G4 when there is no order of selection, so that the packet of electrons is totally reflected towards the front of the tube. The selection potential applied to the grid G4 may be, for example, −5 volts.

Then, the photocathode potential remains positive to inhibit the production of images for a duration which may be of the order of 250 nanoseconds. This period corresponds substantially to the outgoing trip, of the acceleration zone and the gliding zone, by the selected and reflected packet of electrons. It is only after this period that the potential of the photocathode is reset to again start the periodic production of packets of electrons.

D. Output of a Selected Image

When the selected packet of electrons has crossed the major part of the deceleration zone between the grids G'1 and G3, the grid G3 is carried to a less decelerating potential (a positive potential which, however, does not go so far as to exceed Vg1) so that the packet of electrons can completely go through the grid G3.

The other packets of electrons, which are just in front of the selected packet, and which are packets that have just completed their first outgoing trip, have already started returning towards the input face at the instant when the potential of the grid G3 is changed. They are therefore subjected to the effect of a weak field which is, all the same, an accelerating field in the return direction, which drives them on their return trip. There is, therefore, truly a separation between the selected packet and the packets which precede it.

The potential of the grid G3 may range between 0 and 4 volts for example.

Behind the grid G3, it is preferably provided that the surface of the cathodoluminescent output screen ES will be carried to a highly positive potential which accelerates the electrons towards this target. The potential may be of the order of several thousands of volts.

A signals sequencer sets up the necessary synchronization between the different potentials of electrodes to obtain the above described operation.

FIG. 5 shows an example of the actual construction of a tube for the storage and selection of electronic images, according to the invention. Dimensions are given, by way of example, in millimeters.

The input face is formed either by a transparent glass plate 20 coated, on the inner side of the tube, with a layer of photoemissive material 22 forming the photocathode proper, or by a bundle of optic fibers 24, for which the end plane within the tube is also coated with a layer of emissive material 22. For the sake of convenience, these two possibilities have been shown simultaneously in FIG. 5, one in the upper half of the input face and the other in the lower half.

The emissive material may be cesium antimonide $SbCs_3$ or another photoemissive body based on antimony and alkaline metals or based on gallium arsenide and cesium, all these materials having high photon/electron conversion efficiency for visible or near-visible light, enabling the emission of low energy electrons, of the order of one electron-volt.

The grid G4 is placed in the immediate vicinity of the emissive layer (1 millimeter for example). The grid G1 is immediately behind it. These two grids are supported by supports, respectively 26 for G4 and 28 for G1, and these supports act as electrical connections to supply them with the potentials indicated above (constant potential for G1 and variable potential for G4).

Beyond the grid G1, there are one or more cylindrical electrodes E1, which are electrically connected to the grid G1 and maintain a constant potential throughout the gliding zone up to the grid G'1.

The grid G'1 can be borne by a separate support or it can be borne by the electrode E1 at the end of this electrode.

The deceleration zone, which follows the gliding zone, is included between the electrode G'1, located towards the middle of the tube, and the electrode G3, located at the near end of the output face.

The decelerating electrical field in this zone is produced, firstly, by the difference in potential between the grids G'1 and G3 and, secondly, by the electrodes E2 which surround this zone. These electrodes E2 are taken to potentials enabling the decelerating field to be made as uniform as possible throughout the deceleration zone.

A standard construction to obtain a uniform field consists in providing for a cylindrical electrode E2, made of a resistive material, all around the zone, one end of the cylinder being taken to the potential of the grid G'1 which is adjacent to it and the other end being taken to the potential of the grid G3 which is adjacent to it.

Other types of construction are possible, especially the one adopted to make the tube of FIG. 5: the electrode E2 is a helix made of resistive material surrounding the deceleration zone, with one end at the potential Vg1 of the grid G'1 and the other end at the potential of the grid G3.

The output screen used in the construction of FIG. 5 is formed by a bundle of optic fibers 30, of which one face, located on the internal side of the tube, is coated with a fluorescent layer 32, which is itself coated with a fine conductive layer (aluminium) 34 enabling it to be taken to a positive potential of several thousands of volts.

The fluorescent layer 32, designed to form a luminous image when it receives a selected packet of electrons, said image being the reproduction of the light image which has given rise, on the photocathode, to the selected packet of electrons, may be made of copper-activated or silver-activated zinc sulphide, or of magnesia and zinc silicate or, again, of yttrium oxide, yttrium oxysulphide or gadolinium oxysulphide, etc.

The image formed on this layer may be transmitted by optic focusing instead of by a bundle of optic fibers. The fluorescent layer is then deposited on a glass plate enclosing the tube.

It is also possible to interpose, between the grid G4 and the output face, an electron multiplier structure such as those used in light image intensifier tubes.

In one alternative embodiment, it is possible to provide for the tube to comprise, in the gliding space, a deflection device (electrostatic plates or electromagnetic coils) setting up an electrical field or a transversal magnetic field enabling the packet of electrons to be oriented to a particular zone of the output screen. The changing of the potentials at these deflection plates enables another packet to be oriented to another zone. The output screen is thus divided into several zones, and the successive selected packets of electrons get focused on different zones of the screen. Thus, the time available for the analysis of selected images is increased, since an image can remain on the screen even if another selected packet arrives, given that this other packet will come beside the first packet instead of erasing it.

What is claimed is:

1. A method to store a sequence of images arriving at a fast rate, to then select one of these images, with a view to analysis, and to eliminate the other images, said method comprising the steps of:
   focusing the light images at the input of an image converting electron tube;
   converting the light images into electronic images in the form of packets of electrons moving in the vacuum within the tube;
   giving these packets of electrons, by the application of a low-amplitude, accelerating electrical field, a known speed of motion which is very low as compared with the speed of light;
   making the packets of electrons undergo a to-and-fro trip in the tube;
   creating, in a section of the tube, by means of a selection electrode, an electrical field controlled by a selection logic signal, said field having either a first value for which the electrons are pushed back by the electrode towards the interior of the tube, or a second value for which the electrons can go through the electrode, the selection logic signal being produced in synchronism with the arrival of a packet of electrons to be selected in the vicinity of the selection electrode, the instant of arrival being related to the speed of motion of the packets of electrons, and the selection being made during the return trip of the selected packet;
   and finally, producing, at the output of the tube, an electronic image by means of packets of electrons selected by the logic signal, and eliminating the non-selected packets of electrons.

2. A method according to claim 1, wherein a weak electrical accelerating field is created in an accelerating zone extending over a short distance at the output of the input section, and a null electrical field in a shift zone extending over a large distance following the short distance.

3. A method according to claim 2, wherein a decelerating electrical field is created in a deceleration zone that follows the shift zone, the decelerating electrical field being sufficient for all the electrons of a packet to be braked until they stop in the deceleration zone and then get re-accelerated in the return direction.

4. A method according to claim 3, wherein there is applied, to the selection electrode, a potential tending to push a selected packet of electrons back towards the interior of the tube, and to direct the non-selected packets of electrons towards the photocathode.

5. A method according to one of the claims 1 to 4, wherein the selection electrode is placed in a zone such that the transit time taken by the electrons to perform a to-and-fro trip from the photocathode to the selection grid is substantially the same for different energy levels of emission of the electrons when starting from the photocathode, in the range of probable emission energy levels of the photocathode.

6. A device for the temporary storage of light images and for the selection of one image among the stored images, said device comprising an electron tube including:
   an input section enabling the conversion of a light image into an electronic image in the form of packets of electrons;
   a storage section wherein the electrical fields are such that the electrons move at very low speeds as compared with the speed of light;
   a selection electrode taken to a potential that is capable of assuming one value or another under the control of a selection logic signal, one of the potential values enabling the electrons that come towards the electrode to be pushed back and the other potential value enabling the electrons to pass through the selection electrode;
   a means for the removal of the non-selected packets of electrons;
   an output section with a means to reconstitute an electron image from a selected packet of electrons;
   the selection logic signal being applied with a very precise temporal shift with respect to the instant of input of an image to be selected, the shift corresponding to the transit time of the packet of electrons from the input section to the storage section and, in the storage section, up to the vicinity of the selection electrode; and the selection electrode being placed on the input section side of the tube to enable the selection of a packet of electrons on its return trip.

7. A temporary storage and selection device according to claim 6, wherein the selection electrode is a selection grid transparent to electrons.

8. A device according to claim 7, wherein the input section comprises a photocathode, and wherein the storage section comprises:

an acceleration zone between the photocathode and the selection grid, the electrical field in this zone being weak and accelerating for the packets of electrons emitted by the photocathode, the acceleration zone extending over a short distance from the photocathode;

a gliding zone extending over a predetermined distance of the tube, after the acceleration zone, the electrical field in the gliding zone being substantially null;

a deceleration zone following the gliding zone, the electrical field in this zone being decelerating for the packets of electrons emitted by the photocathode, and the deceleration zone extending over a distance which is not negligible compared with the length of the tube.

9. A device according to one of the claims 7 and 8, comprising means to carry the selection grid either to a potential equal to that prevailing in the gliding zone or to a potential which is more negative than that of the photocathode, and means to reduce the decelerating field in the deceleration zone when a selected packet of electrons again crosses this zone after a to-and-fro trip in the tube, the reduction of the field being sufficient to permit the movement of the packet of electrons up to the output section of the tube.

10. A device according to claim 9, wherein the output section has an output grid, the potential of which may be made to vary to modify the value of the electrical field in the deceleration zone.

11. A device according to claim 6, wherein the tube has mean to subject the packets of electrons to an outgoing trip and a return trip in the tube between the input section and the selection electrode, the latter being placed in the tube at a place such that the transit time taken by the electrons to make a to-and-fro trip from the photocathode to the selection grid is substantially the same for the emission energy levels of the electrons when starting from the photocathode, in the range of probable energy levels of emission of the photocathode.

* * * * *